United States Patent [19]

Takai

[11] 4,062,531
[45] Dec. 13, 1977

[54] FERRUGINOUS SLAG OXIDIZING APPARATUS

[75] Inventor: Kiyoshi Takai, Nishinomiya, Japan

[73] Assignee: Osaka Iron & Steel Co., Ltd., Osaka, Japan

[21] Appl. No.: 761,993

[22] Filed: Jan. 24, 1977

[30] Foreign Application Priority Data

July 7, 1976 Japan .................................. 51-79847

[51] Int. Cl.² .............................................. C21C 7/00
[52] U.S. Cl. .................................... 266/226; 266/235
[58] Field of Search ............... 266/201, 216, 217, 220, 266/225, 226, 233, 235

[56] References Cited

U.S. PATENT DOCUMENTS

| | | | |
|---|---|---|---|
| 384,628 | 6/1888 | Johnson | 266/217 |
| 2,890,039 | 6/1959 | Schmidt | 266/216 |
| 3,212,882 | 10/1965 | Garfinkle | 266/226 |
| 3,791,813 | 2/1974 | Ramachandran et al. | 266/217 |
| 3,843,105 | 10/1974 | Chang | 266/226 |
| 3,971,655 | 7/1976 | Takashima et al. | 266/217 |

FOREIGN PATENT DOCUMENTS

| | | | |
|---|---|---|---|
| 292,912 | 3/1971 | U.S.S.R. | 266/217 |
| 410,103 | 5/1974 | U.S.S.R. | 266/225 |

*Primary Examiner*—Gerald A. Dost
*Attorney, Agent, or Firm*—Kane, Dalsimer, Kane, Sullivan and Kurucz

[57] ABSTRACT

The disclosure is of apparatus useful for oxidizing and mixing molten ferruginous metallurgical slags such as converter slag, electric steel making furnace slag and open hearth furnace slag.

6 Claims, 2 Drawing Figures

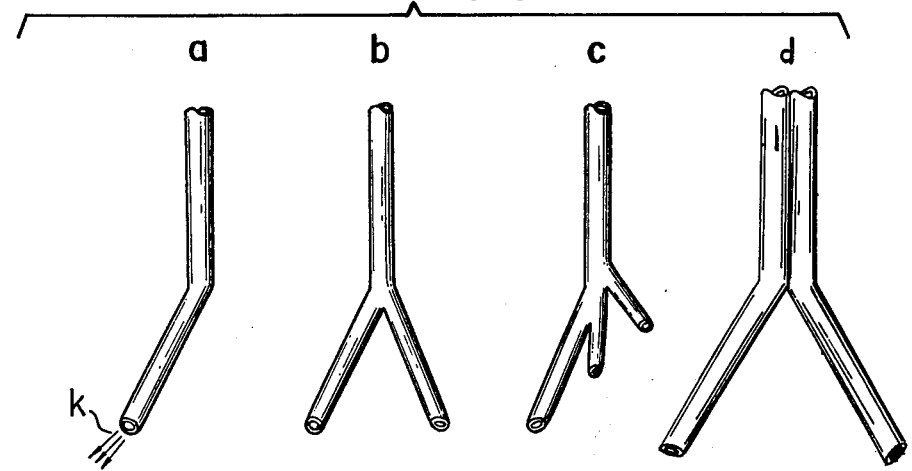
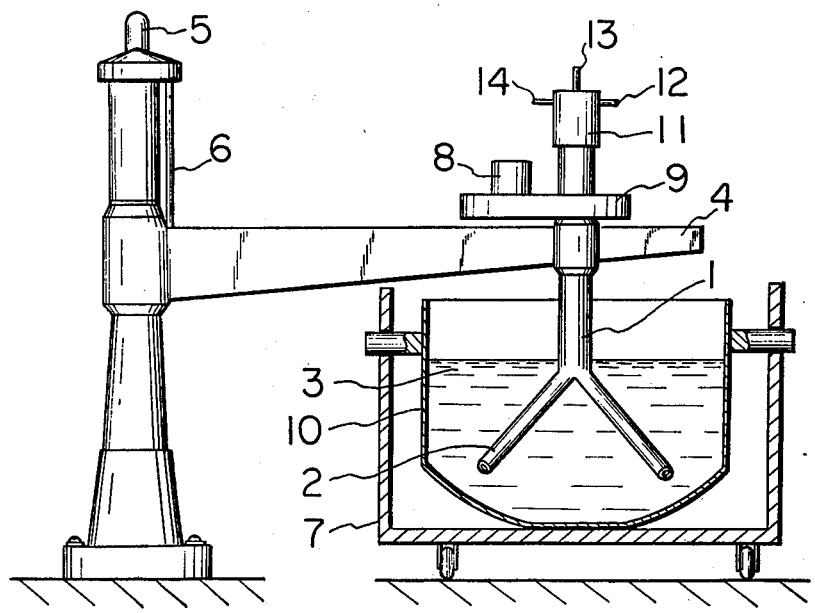

FERRUGINOUS SLAG OXIDIZING APPARATUS

BACKGROUND OF THE INVENTION

1. Field of the Invention

The invention relates to steel making and more particularly relates to apparatus for treating the slag by-product of steel making.

2. Brief Description of the Prior Art

It has recently become known that certain ferruginous metallurgical slags, while in the molten state, may be stabilized and improved by oxidizing the metallic iron content of the slags and then cooling the oxidized slag to yield a lump type slag. It is desirable to agitate the molten slag during oxidation. The slags so treated are improved in stability and find use as artificial sands or as aggregated sands useful as a component of concrete and like mixtures. The apparatus of the present invention is particularly useful for the agitation and oxidation of molten slag in a slag ladle.

Prior to my invention, blowing lances were known, having single and multiple nozzle outlets. Generally these lances were operated by lowering the nozzle end to a position above the molten surface of a slag. However, to meet the requirements of the above described new process for improving slags, it is desirable that the lance be immersed in the slag and the slag be simultaneously agitated. The apparatus of the invention meets these requirements and provides a means of oxidizing and agitating a molten slag in very short times. The apparatus overcomes problems associated with simultaneous oxidation and mixing of slags having high viscosities.

SUMMARY OF THE INVENTION

The invention comprises apparatus for oxidizing and mixing molten ferruginous metallurgical slags, which comprises;

a blowing lance having an open inlet end, an open nozzle end, a nozzle on said nozzle end and a hollow pipe joining said ends, the axis of said nozzle being disposed at an angle of less then 90° but more than 0° to the vertical;

support means for said lance, attached to the lance and adapted to raise and lower said lance in a vertical plane;

means for rotating said lance about its vertical axis, said rotating means being connected to said lance; and means for cooling said lance attached to the lance.

BRIEF DESCRIPTION OF THE DRAWINGS

FIG. 1 is an isometric view of four lance components useful in the apparatus of the invention.

FIG. 2 is a cross-section in part of an embodiment apparatus of the invention.

DETAILED DESCRIPTION OF THE PREFERRED EMBODIMENTS OF THE INVENTION

It has recently become known that improved slags, the by-product of steel making may be obtained by adjusting the chemical composition thereof to obtain specific compositions and then oxidizing the molten slag by blowing oxygen into the slag body itself. Adjustment of the chemical composition is generally by admixture of different slags to obtain a composite of specific composition. The present invention is of apparatus particularly useful in a simultaneous oxidation and agitation (stirring) of ferruginous metallurgical slags.

The apparatus of the invention will be appreciated from the following description of the preferred embodiments when read in conjunction with the accompanying drawings of FIGS. 1 and 2. FIG. 1 is an isometric view in part of four embodiment lance shapes which may be advantageously employed as component blowing lances in the apparatus of the invention. The embodiment lance (a) is an example in which a single branch shaft or pipe has a bend of about 30° inclination from the main shaft or pipe. The nozzle $k$ is disposed in the lower end of the bend so that the nozzle $k$ directs the flow of gas therefrom at an angle of 30° from the vertical. The angle may be any angle less than 90° but more than 0°. Lance (b) is an example in which double branch pipes have their lance nozzle ends at the same level and extend from the main shaft or pipe. Again the nozzle ends are bent from the vertical so that the nozzle axis of each nozzle is disposed at an angle of from more than 0° to less than 90° from the vertical.

The lance (c) is an example in which multiple branch pipes have their nozzle ends at different levels. The nozzle axis in each instance of each nozzle is disposed at an angle less than 90° but more than 0° against the vertical as in lances (a) and (b). Lance (d) is an example in which a number of shafts or pipes are bound together and their nozzle ends positioned at the same level or at different levels. The axis of each nozzle is directed at an angle of less than 90° but more than 0° to the vertical.

The lances (a), (b), (c) and (d) may be used as components of the embodiment apparatus of the invention shown in FIG. 2. FIG. 2 is a cross-sectional-in-part side elevation showing the following. In FIG. 2, a mixed slag 3 of converter and blast furnace slags is carried in ladle 10 by a car 7 to a position under blowing lance 1. As shown, lance 1 is partially immersed in slag 3, the nozzle ends 2 being under the surface of the molten slag. The lance 1 may be raised out of slag 3 or lowered into it by support arm 4. Support arm 4 and supported lance 1 is raised or lowered by rotation and counter-rotation of shaft 6, driven by motor 5. With arm 4 lowered as shown, lance 1 may be rotated about its vertical axis by motor 8 through speed reduction gear train 9. The shape of the lance 1 with its multiple, angled nozzle ends aids in the mixing of slag 3 when the lance 1 is rotated therein. The lance 1 may be rotated in a clockwise or a counter clockwise direction or both directions. Simultaneously with rotation of lance 1, an oxygen containing gas is carried from a source (not seen in FIG. 2) into inlet 13, through lance 1 and is discharged through the lance 1 nozzle into slag 3. The oxygen gas jet is ejected in many directions (according to the axis of the nozzle) for effective mixing and agitation of the slag 3 while the lance rotates for mixing and while slag 3 undergoes oxidation by the oxygen contact.

Lance 1 is joined to oxygen inlet 13 by a rotating coupling 11 which also joins the lance 1 to a cooling water inlet 12 and a cooling water outlet 14 which serve as a means of cooling lance 1 while it is immersed in slag 3. Since the inclined part of the lance 1 rotates, the water cooled part of the lance 1 is always in contact with the high temperature part. Solidification of slag 3 around the lance 1 is thus prevented, however by the continued rotation of lance 1.

The following Example describes the manner and process of using the invention and sets forth the best mode contemplated by the inventor of carrying out the invention but is not to be construed as limiting.

showed very low values and proved the effectiveness of the apparatus of the invention.

Table 1

| Items | Basicity (CaO/SiO$_2$) | Chemical composition % | | | | | | | | | Metallic iron % | Oxygen blowing condition |
|---|---|---|---|---|---|---|---|---|---|---|---|---|
| | | SiO$_2$ | CaO | Al$_2$O$_3$ | Total Fe* | MnO | TiO$_2$ | MgO | P$_2$O$_5$ | S | | |
| Before (control) oxygen agitation | 1.46~ 1.61 | 28.20~ 31.15 | 43.55~ 45.90 | 8.26~ 13.15 | 3.95~ 6.09 | 1.16~ 1.74 | 0.79~ 1.08 | 2.50~ 2.86 | 0.39~ 0.82 | 0.9~ 1.42 | 0.65~ 2.72 | — |
| Example 2 | 1.49~ 1.54 | 29.49~ 30.45 | 44.50~ 45.43 | 10.18~ 11.61 | 5.72~ 6.58 | 1.12~ 1.59 | 0.82~ 1.06 | 2.38~ 2.81 | 0.52~ 0.73 | 0.5~ 0.77 | 0.02~ 0.04 | 4 Nm$^3$ 8 min. |
| Example 1 | 1.47~ 1.51 | 29.50~ 30.2 | 43.8~ 45.9 | 10.0~ 11.2 | 5.52~ 6.29 | 1.2~ 1.6 | 0.91~ 0.95 | 2.4~ 2.8 | 0.4~ 0.6 | 0.9~ 1.0 | 0.02~ 0.03 | 6 Nm$^3$ 5 min. |

*From FeO and Fe$_2$O$_3$

EXAMPLE 1

A molten synthetic slag (about 6 tons) is made by admixture of a blast furnace slag and a converter slag in a ratio of 4 to 1. The slag is charged to the ladle 10 of apparatus as shown in FIG. 2. The lance 1 having branch pipes and nozzles thereon with inclination of the nozzle axis at about 30° against the vertical is lowered into the molten slag and rotated slowly. During rotation, pure oxygen gas is blown for 5 minutes through the water cooled lance at the rate of 6 Nm$^3$ per minute, into the slag body. After the oxygen jet agitation taken place, the slag is cast into a pit and allowed to slowly cool and solidify. The product slag is sampled from 18 places and their chemical compositions analyzed. The result is shown in Table 1 below.

EXAMPLE 2

The procedure of Example 1, supra, is repeated except that the oxygen is applied at a rate of 4 Nm$^3$ for 8 minutes, through an ordinary and conventional lance, i.e.; to the surface of the molten slag. The molten slag is not agitated as in Example 1. Following application of oxygen, the slag is cast into a pit and allowed to slowly cool and solidify. The product slag is sampled from 18 places and the chemical composition analyzed. The result is shown in Table 1 below.

As shown in Table 1, variation of chemical composition of the slag agitated by the method of this invention and metallic iron particles physically mixed in the slag

I claim:
1. Apparatus for oxidizing and mixing molten ferruginous metallurgical slags, which comprises;
   a blow lance having an open inlet end, an open nozzle end, a plurality of nozzles positioned on said nozzle end, at different distances from said inlet end, and a hollow pipe joining said ends, the axis of each of said nozzles being disposed at an angle of less than 90° but more than 0° to the vertical;
   support means for said lance, attached to the lance and adapted to raise the lower said lance in a vertical plane;
   means for rotating said lance about its vertical axis, said rotating means being connected to said lance; and
   means for cooling said lance attached to the lance.
2. The apparatus of claim 1 wherein the angle of said nozzle axis is formed by a bend in the nozzle end of said lance.
3. The apparatus of claim 1 wherein said angle is 30°.
4. The apparatus of claim 1 wherein said support means is an arm which is mechanically movable in a vertical plane.
5. The apparatus of claim 1 wherein said means for rotating the lance comprises a motor and speed reduction gear train.
6. Apparatus according to claim 1 wherein said means for cooling comprises a rotatable coupling, a water inlet and a water outlet mounted on the inlet end of said lance.

* * * * *